US012281786B2

(12) United States Patent
Qiao et al.

(10) Patent No.: US 12,281,786 B2
(45) Date of Patent: Apr. 22, 2025

(54) LIGHT DISTRIBUTION ELEMENT AND LAMP

(71) Applicants: SUZHOU OPPLE LIGHTING CO., LTD., Suzhou (CN); OPPLE LIGHTING CO., LTD., Shanghai (CN)

(72) Inventors: Shengjie Qiao, Suzhou (CN); Guolong Ni, Suzhou (CN)

(73) Assignees: SUZHOU OPPLE LIGHTING CO., LTD., Suzhou (CN); OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 17/993,769

(22) Filed: Nov. 23, 2022

(65) Prior Publication Data

US 2023/0093070 A1 Mar. 23, 2023

Related U.S. Application Data

(63) Continuation of application No. PCT/CN2021/096689, filed on Dec. 2, 2021.

(51) Int. Cl.

*F21V 3/02* (2006.01)
*F21Y 101/00* (2016.01)
*F21Y 115/10* (2016.01)

(52) U.S. Cl.

CPC ............ *F21V 3/02* (2013.01); *F21Y 2101/00* (2013.01); *F21Y 2115/10* (2016.08)

(58) Field of Classification Search

CPC ..... F21V 3/02; F21Y 2115/10; F21Y 2101/00

(Continued)

(56) References Cited

U.S. PATENT DOCUMENTS

2016/0223148 A1 8/2016 Grajcar
2018/0195692 A1* 7/2018 Monteiro ............. F21V 7/0008

FOREIGN PATENT DOCUMENTS

CN 201363589 Y 12/2009
CN 201983032 U 9/2011

(Continued)

OTHER PUBLICATIONS

English translation of CN108591897A (Year: 2018).*

(Continued)

*Primary Examiner* — Joseph L Williams
*Assistant Examiner* — Hana S Featherly
(74) *Attorney, Agent, or Firm* — Arch & Lake LLP; Hao Tan; Shen Wang

(57) ABSTRACT

The present disclosure discloses a light distribution element and a lamp, the light distribution element is configured to distribute light for a light source, and the light distribution element includes at least two first light distribution modules arranged along a height direction of the light distribution element, the at least two first light distribution modules surround the light source in a circumferential direction, each of the at least two first light distribution modules includes a light incident surface and a light output surface that are away from each other, and the light incident surface is arranged opposite to the light source, each of the at least two first light distribution modules has a divergent light configuration from the light incident surface to the light output surface; and a depression region is between two adjacent first light distribution modules.

10 Claims, 5 Drawing Sheets

(58) Field of Classification Search
USPC .......................................................... 362/235
See application file for complete search history.

(56) References Cited

FOREIGN PATENT DOCUMENTS

| | | | | | |
|---|---|---|---|---|---|
| CN | 202747235 U | | 2/2013 | | |
| CN | 203202831 U | | 9/2013 | | |
| CN | 108591897 A | * | 9/2018 | ............ | F21K 9/232 |
| CN | 108826036 A | | 11/2018 | | |
| CN | 210398777 U | | 4/2020 | | |
| CN | 111486352 A | | 8/2020 | | |

OTHER PUBLICATIONS

International Search Report of PCT Application No. PCT/CN2021/096689 dated Jul. 21, 2021 with English translation, (6p).

* cited by examiner

LIGHT DISTRIBUTION ELEMENT AND LAMP

CROSS-REFERENCE TO RELATED APPLICATIONS

This application is based upon and claims the priority of PCT patent application No. PCT/CN2021/096689 filed on Dec. 2, 2021 which claims priority to the Chinese patent application No. 202010475497.8 filed on May 29, 2020, the entire contents of which are hereby incorporated by reference herein for all purposes.

TECHNICAL FIELD

The present disclosure relates to a technical field of lighting, and in particular to a light distribution element and a lamp.

BACKGROUND

A light-emitting diode (LED) corn lamp is a commonly used lamp, both a shape of the LED corn lamp and the distribution of lamp beads are like a corn cob, and the LED corn lamp can emit light 360° in a circumferential direction, thus it is called as the LED corn lamp. Sometimes, an LED corn lamp includes an installation cylinder and LED lamp beads arranged along a circumferential side wall of the installation cylinder.

SUMMARY

The present disclosure discloses a light distribution element and a lamp.

In a first aspect, the present disclosure provides a light distribution element, which is configured to distribute light for a light source, and the light distribution element comprises at least two first light distribution modules arranged along a height direction of the light distribution element, the at least two first light distribution modules surround the light source in a circumferential direction, each of the at least two first light distribution modules comprises a light incident surface and a light output surface that are away from each other, and the light incident surface is arranged opposite to the light source, each of the at least two first light distribution modules has a divergent light configuration from the light incident surface to the light output surface; a depression region is between two adjacent first light distribution modules.

In a second aspect, the present disclosure provides a lamp, which comprises a light source assembly and any one of the light distribution elements mentioned above, in which the light source assembly comprises at least two first light source modules arranged along a height direction of the lamp, the light distribution element comprises at least two first light distribution modules arranged along the height direction of the lamp, one of the at least two first light distribution modules covers one of the at least two first light source modules, and the one of the at least two first light distribution modules covers the one of the at least two first light source modules along the circumference direction of the lamp.

It is to be understood that the foregoing general description and the following detailed description are exemplary and explanatory only and are not restrictive of the disclosure.

BRIEF DESCRIPTION OF THE DRAWINGS

The drawings described herein are provided to further understand the present disclosure and constitute a part of the present disclosure. The examples of the present disclosure and their descriptions are used for explaining the present disclosure, and do not have an improper limitation on the present disclosure. In the drawings.

DETAILED DESCRIPTION

Figure 1:
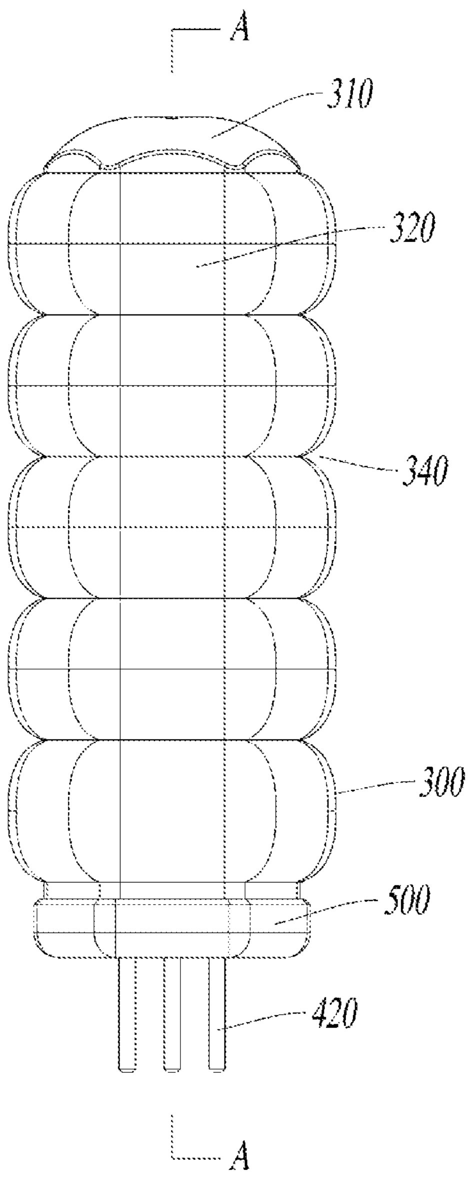
FIG. 1 is a schematic structural diagram of a lamp according to an example of the present disclosure.

In order to make objectives, technical details and advantages of the examples of the present disclosure more clearly, the technical solutions of the examples will be described in a clearly and fully understandable way in connection with the drawings related to the examples of the present disclosure. The described examples are just a part but not all of the examples of the present disclosure. Based on the described examples herein, those skilled in the art can obtain other example(s), without any inventive work, which should be within the scope of the present disclosure.

Reference numeral used in this disclosure may include: 100—installation base, 200—light source assembly, 210—first light source module, 220—second light source module, 230—light emission body, 240—substrate, 300—light distribution element, 310—first light distribution module, 320—second light distribution module, 330—light distribution unit, 331—light incident surface, 332—light output surface, 340—depression region, 341—depression portion, 350—matching portion, 400—driving component, 410—electronic control board, 411—conversion connection surface, 420—electronic connection portion, 500—lamp holder.

For an LED corn lamp that includes an installation cylinder and LED lamp beads arranged along a circumferential side wall of the installation cylinder, because most of light emitted by the LED lamp beads is concentrated in a normal direction of the side wall of the installation cylinder, a light divergence of the LED corn lamp is insufficient, which results in a dark region or a shadow on the LED corn lamp, and the problem is especially prominent on an end of the LED corn lamp.

The technical solutions disclosed by various examples of the present disclosure are described in detail below in combination with the accompanying drawings.

Referring to FIG. 1 to FIG. 4, at least one example of the present disclosure discloses a light distribution element 300, which is configured to distribute light for a light source. In the present example, the disclosed light distribution element

300 comprises at least two first light distribution modules 310 arranged along a height direction of the light distribution element 300, that is to say, a number of the first light distribution modules 310 may be two, or more than two; of course, the present example does not limit the specific number of the first light distribution modules 310. In practical application, the light distribution elements 300 are arranged opposite to the light source, light emitted by the light source is projected onto the light distribution element 300, and the light distribution element 300 can distribute the light.

Specifically, the first light distribution modules 310 surround the light source in a circumferential direction. In such arrangement, each of the first light distribution modules 310 can realize 360° light distribution in the circumferential direction of the light source. Each of the first light distribution modules 310 comprises a light incident surface and a light output surface that are away from each other, and the light incident surface is disposed opposite to the light source. In a specific light distribution process, the light emitted by the light source is first projected onto the light incident surface, and then emitted from the light output surface after a light distribution process by the first light distribution modules 310.

It should be noted that, at present, the light emitted by the light source is generally scattered light, that is, light rays are not parallel to each other, but there will be a certain angle difference. Among these light rays, the angle difference of two light rays with a largest angle difference is a maximum angle difference. Sometimes, a lamp generally comprises a lamp shade. In the case where the light emitted by the light source passes through the lamp shade, the maximum angle difference of the light rays does not change. Because the light rays are mostly concentrated in a normal direction of the light source itself, and most regions on a surface of the lamp shade lack light irradiation, which leads to more dark regions and shadows on the surface of the lamp shade.

Figure 4:
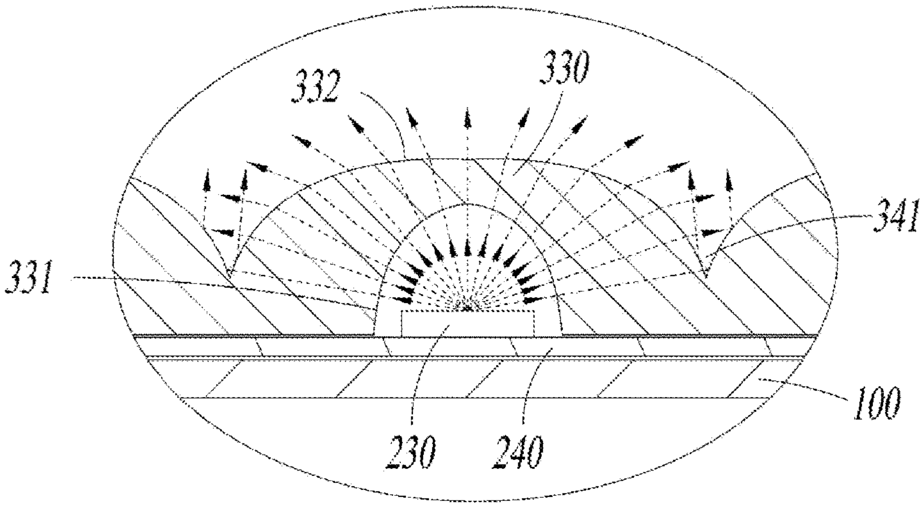
FIG. 4 is a partial enlarged view at B in FIG. 3 (a light distribution light path is shown)

In the present example, each of the first light distribution modules 310 is in a divergent light configuration from the light incident surface to the light output surface. It should be understood that, as shown in FIG. 4, in a specific working process, in the case where the light emitted by the light source is projected onto the light incident surface, the light enters the first light distribution module 310 for distributing light, and after the light exits from the light output surface, the light is scattered again, which makes the light more divergent as a whole, specifically, the maximum angle difference of the output light is significantly greater than that of the incident light.

In the case where the maximum angle difference of the output light becomes larger, an included angle between a part of light and the surface of the light distribution element 300 becomes smaller, that is, it is closer to the surface of the light distribution element 300, so that there will be more light emitted on the surface of the light distribution element 300, therefore the dark regions and shadows on the surface of the light distribution element 300 can be eliminated. Combined with the above descriptions, because the first light distribution modules 310 are disposed around the light source in the circumferential direction, each of the first light distribution modules 310 can eliminate dark regions and shadows in the circumferential direction of the light distribution element 300, that is, the first light distribution modules 310 can eliminate the dark regions of 360° on the surface of the light distribution element 300; at the same time, a plurality of first light distribution modules 310 are arranged along the height direction of the light distribution element 300, therefore under a joint action of all of the first light distribution modules 310, the dark regions of the light distribution element 300 can be eliminated without a dead angle on the whole surface.

It should be noted that the surface of the lamp is the surface of the light distribution element 300, therefore, in the case where the light distribution element 300 disclosed in the present example is applied to the lamp, it can realize the elimination of the dark regions on the entire surface of the lamp without the dead angle.

Generally, a depression region 340 is provided between two adjacent first light distribution modules 310, and the depression region 340 is generally a spaced region between two adjacent first light distribution modules 310, that is, the depression region 340 is a spaced region existing because a density of the first light distribution modules 310 is generally not enough to make the first light distribution modules 310 completely cover the surface of the light distribution element 300. Of course, the depression region 340 may also be a recessed structure formed based on the structural configuration of the first light distribution modules 310. Sometimes, the depression region 340 mentioned above is very easy to form a large dark region or a large shadow because of the lack of light irradiation. In the present example, the light after the light distribution by the first light distribution modules 310, especially the light emitted from edges of the first light distribution modules 310, can be projected onto the depression regions 340, thereby eliminating the dark region.

The light distribution element 300 disclosed in the present example can be directly used as the lamp shade, which can not only distribute light for the light source, but also play a certain role in protecting the light source; of course, the light distribution element 300 can also be arranged as a part of the lamp shade.

It can be seen from the above descriptions, in the light distribution element 300 disclosed in the present disclosure, it comprises at least two first light distribution modules 310 arranged along its height direction, and the first light distribution modules 310 are arranged around the light source in the circumferential direction, In this way, the light distribution of the lamp in the circumferential direction of 360° can be realized; at the same time, based on the divergent light configuration of the first light distribution modules 310, the light emitted by the light source is scattered after passing through the first light distribution modules 310, a larger irradiation coverage is achieved in the light output direction of the first light distribution modules 310, so that light paths of the light can be closer to the surface of the light distribution element.

Compared with other implementations, in the case where the light distribution element 300 disclosed in the present disclosure is applied to the lamp, the lamp has a larger range of irradiation coverage surface, which not only improves an energy consumption utilization rate of the lamp, at the same time, after the light emitted by the light source is dispersed by the light distribution element, the light paths of the light are closer to the surface of the lamp, which can effectively eliminate the dark region on the lamp. Moreover, because the first light distribution modules 310 are arranged along the height direction of the lamp and it can distribute light in the 360° circumferential direction of the lamp, therefore the light distribution element 300 can undoubtedly eliminate the dark region on the entire surface of the lamp without the dead angle. On a basis of eliminating the dark region, users can get a better sense of lighting experience.

In the present example, the first light distribution modules 310 may have various specific types. For example, the first light distribution modules 310 constitute an integral ring-shaped light distribution structure, which has one light incident surface and one light output surface. In another example, the first light distribution modules 310 may comprise a plurality of light distribution units 330 arranged around the light source in the circumferential direction, and each of the plurality of light distribution units 330 comprises a light incident surface unit 331 and a light output surface unit 332 that are away from each other; in one of the first light distribution modules, the light incident surface units 331 are connected to each other along the circumferential direction to form the light incident surface.

It should be understood that, sometimes, the light distribution units 330 are generally arranged at intervals, and the light sources that can be arranged on the lamp are limited, therefore a light intensity of the whole lamp further comprises an upper limit; secondly, because the light emitted by the light source is generally concentrated in front of a normal direction of the light source itself, after the light is scattered by the light distribution units 330 again, an output angle of the light will become larger, thus, the overall intensity of the light decreases, and the light efficiency becomes worse.

In the present example, because the light incident surface units 331 of different light distribution units 330 are connected to each other, in one of the first light distribution modules 310, the light distribution units 330 are no longer separated as other implementations, that is, there is no partition structure between the light distribution units 330, therefore in a same installation space, the first light distribution modules 310 can install and accommodate more light sources, so that more light can be emitted. Because the light incident surface units 331 form a uniform light incident surface, all the light rays can be emitted from the light incident surfaces of the first light distribution modules 310 and then emitted from the light output surfaces. From an application of the whole of the light distribution element 300 to the lamp, the light sources are increased, which can undoubtedly improve a lighting brightness of the lamp, thereby making the light effect better.

At the same time, because the number of light sources in the circumferential direction of the lamp increases, a size of the dark region generated by adjacent light sources on the light emergent surface of the light distribution element 300 can further be reduced, which is undoubtedly beneficial to reduce the dark region on the surface of the lamp.

Generally, in the first light distribution modules 310, the light output surface units 332 of the light distribution units 330 may be connected to each other. In such an arrangement, there is no spaced region between the light distribution units 330 in the circumferential direction of the lamp, that is, light will pass through the light distribution elements 300 in the circumferential direction of the lamp, which can undoubtedly avoid the dark region in the circumferential direction of the lamp. The example does not limit the specific matching relationship of the light output surface units 332 in the first light distribution modules 310. In an optional example, only some of the light output surface units 332 of the light distribution units 330 may be connected to each other, or all the light emergent surface units 332 of the light distribution units 330 may be arranged at intervals.

As mentioned above, the emitted light after light distribution and scattering will enter the depression region 340, thereby playing the role of eliminating the dark region. In the present example, on the light distribution element 300, the depression region 340 may be arranged for scattering the light emitted by the light source.

It should be understood that the output light will continue to propagate to the surfaces of the adjacent first light distribution modules 310 after being projected onto the depression regions 340. In this case, the light projected onto the surfaces of the adjacent first light distribution modules through the depression regions 340 will be reflected again, and the light paths will be changed to converge with other light, thereby improving the overall light intensity and light effect of the lamp.

Figure 3:
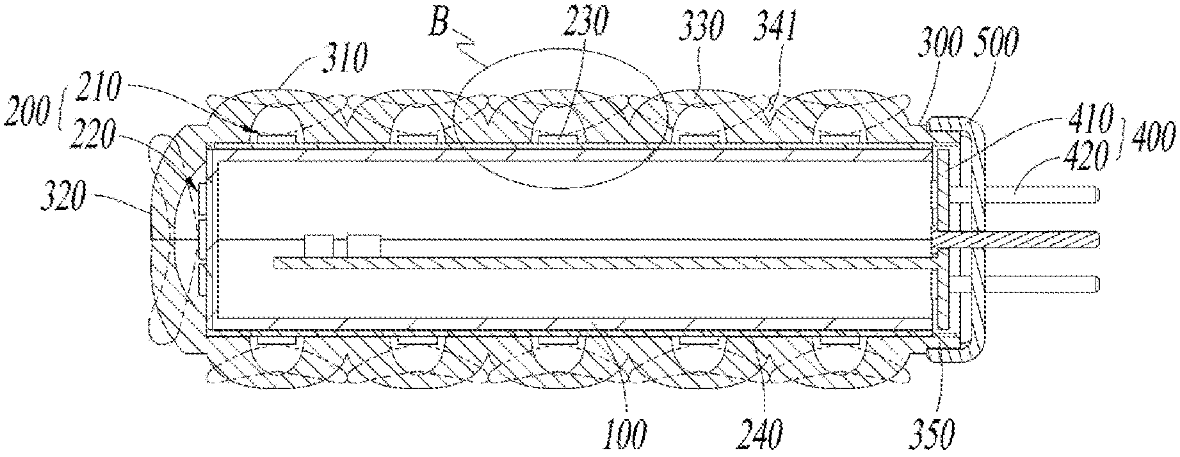
FIG. 3 is a cross-sectional view along A-A of FIG. 1 (a light distribution light type is shown)

As mentioned above, in the present example, there are various specific forms of the depression regions 340. For example, in the case where the first light distribution modules 310 are arranged at intervals on the surface of the light distribution element 300, the depression regions 340 are the spaced regions between two adjacent first light distribution modules 310. In another example, as shown in FIG. 3 and FIG. 4, in the height direction of the light distribution element 300, two adjacent light distribution units 330 may be connected to each other, and a depression portion 341 is formed therebetween; in the circumferential direction of the light distribution element 300, a plurality of depression portions 341 constitute the depression regions 340.

Specifically, in such arrangement, in the circumferential direction of the light distribution element 300, a plurality of depression portions 341 can form the depression region 340, thereby ensuring the beneficial effects of the depression region 340 mentioned above; at the same time, the two adjacent first light distribution modules 310 are disposed near to each other, so that there is no longer a region without light passing on the surface of the light distribution element 300 where the depression regions 340 are located, which can undoubtedly avoid the dark region in the height direction of the lamp. Furthermore, in such arrangement, a structure design of the light distribution element 300 can be made more compact, and under a same surface area, more first light distribution modules 310 can be disposed on the light distribution element 300, and thus more light sources can be adapted in the light distribution element 300, thereby can further improve the light intensity and the light effect of the whole lamp.

In the present example, the specific type of the light distribution unit 330 is not limited, and the light distribution unit 330 can generally be selected as a lens structure, such as a Fresnel lens; of course, the light distribution element 300 can also be other light distribution structure, for example, a reflection structure such as a plane mirror, a reflection prism and so on. Specifically, the reflection structure can reflect the light on the surface of the light distribution element 300 to change the light path of the light and reflect the light to the depression regions 340 and other region on the surface of the light distribution element 300 where the dark region may be existed. With reference to FIG. 1 to FIG. 7, based on the light distribution element mentioned above, the example of the present disclosure further discloses a lamp, and the disclosed lamp comprises a light source assembly 200 and the light distribution element 300 mentioned above. The light source assembly 200 is a light emission component of the lamp. In the present example, the light distribution element 300 is covered outside the light source assembly 200, that is, the light distribution element 300 distributes the light emitted by the light source assembly 200.

Specifically, the light source assembly 200 comprises at least two first light source modules 210 arranged along a height direction of the lamp, and the light distribution element 300 comprises at least two first light distribution modules 310 arranged along the height direction of the lamp, one of the at least two first light distribution module 310 covers one of the at least two first light source modules 210, and the one of the at least two the first light distribution modules 310 covers the one of the at least two first light source modules 210 along the circumferential direction of the lamp. It should be understood that the number of the first light source modules 210 and the number of the first light distribution modules 310 may be two or more than two respectively; of course, the present example does not limit the specific number of the first light source modules 210. In practical application, one of the at least two first light distribution modules 310 covers one of the at least two first light source modules 210, and the light emitted by the one of the at least two first light source modules 210 is projected onto the one of the at least two first light distribution modules 310, and the one of the at least two first light distribution modules 310 can distribute the light.

Figure 2:
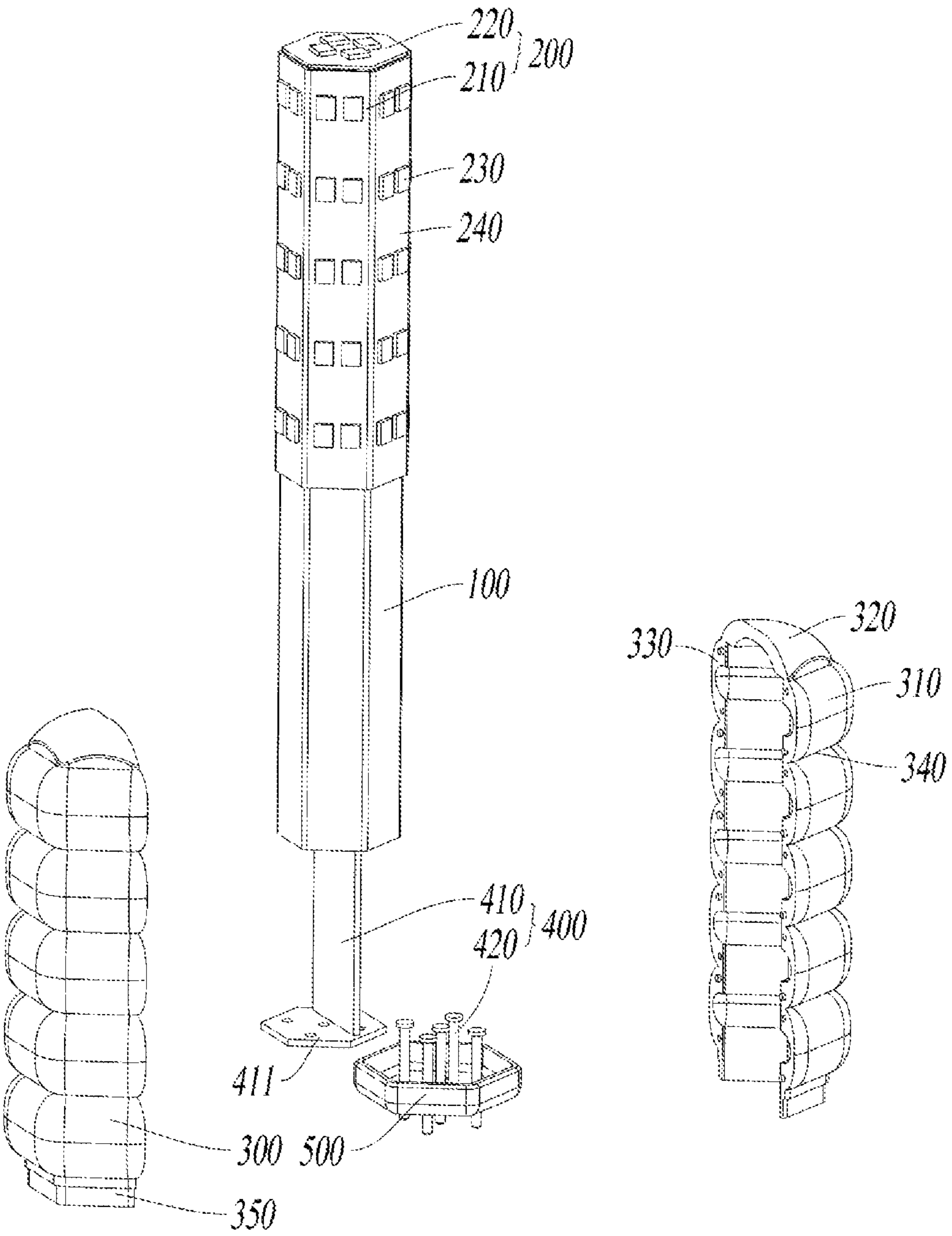
FIG. 2 is a schematic diagram of a decomposition structure of the lamp according to an example of the present disclosure.

As shown in FIG. 1 and FIG. 2, in combination with the example mentioned above, the first light distribution modules 310 are arranged in the height direction of the light distribution element 300, and the first light source modules 210 are also arranged along the height direction of the lamp. This arrangement is relatively simple, and a shape of each of the first light distribution modules 310 is relatively regular, which reduces the difficulty of arrangement and the processing difficulty of the light distribution element 300 of the whole lamp.

It should be noted that, the light distribution element 300 is formed through a method of molding during a process of production and processing, the light distribution element 300 generally comprises a first sub-portion and a second sub-portion, and the two sub-portions are respectively molded and then assembled together to form the light distribution element 300; generally, the first sub-portion and the second sub-portion can be assembled by arranging positioning structures that can match with each other. In a specific lamp assembly process, the first sub-portion and the second sub-portion are sleeved on the outside of the assembled light source assembly 200, and then the light distribution element 300 can be assembled later. In the case of disassembling the lamp, the first sub-portion is separated from the second sub-section, then the light source assembly 200 can be taken out from the light distribution element 300, and the light source assembly 200 can also be serviced.

Figure 5:
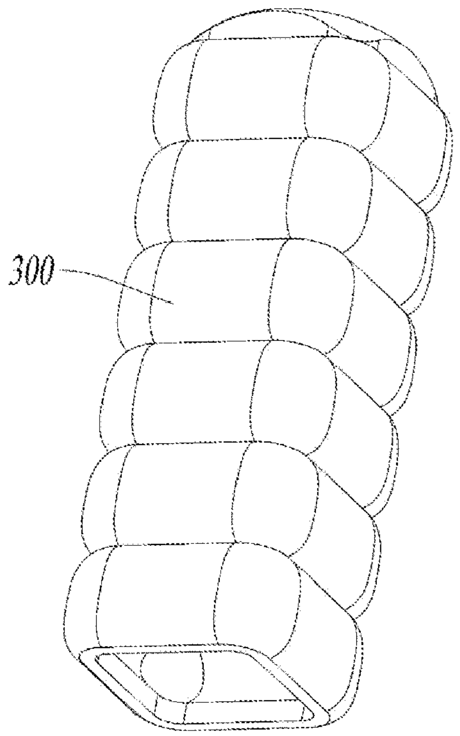
FIG. 5 is a schematic structural diagram of a first light distribution element according to an example of the present disclosure.
Figure 6:
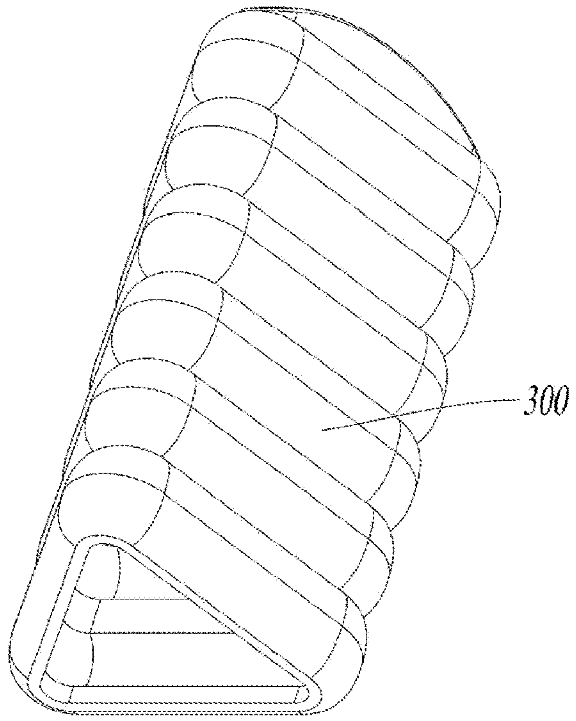
FIG. 6 is a schematic structural diagram of a second light distribution element according to an example of the present disclosure.
Figure 7:
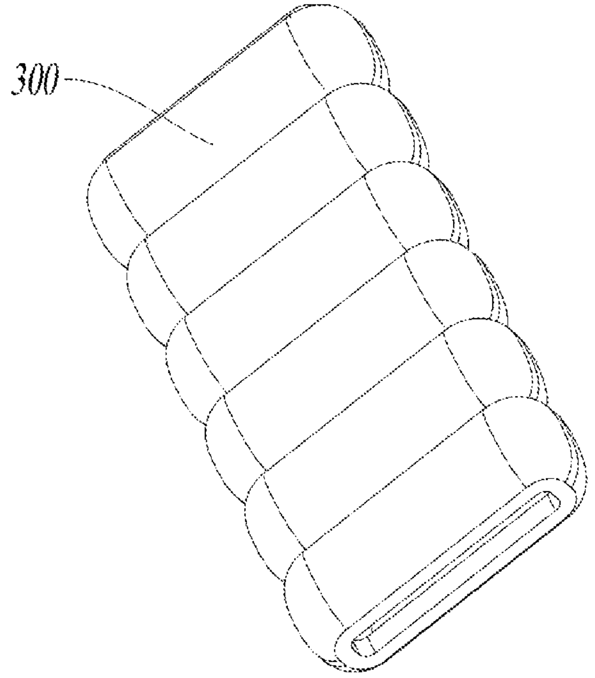
FIG. 7 is a schematic structural diagram of a third light distribution element according to an example of the present disclosure.

In the present example, a shape contour of the light distribution element 300 is not limited. As shown in FIG. 1 and FIG. 2, the light distribution element 300 may be in a shape of a regular hexagonal prism; as shown in FIG. 5, the light distribution element 300 may be in the shape of a regular quadrangular prism; as shown in FIG. 6, the light distribution element 300 may be in the shape of a regular triangular prism; As shown in FIG. 7, the light distribution element 300 may be in the shape of a cuboid.

The light source assembly 200 comprises a light emission body 230. Generally, the light emission body 230 can be selected as an LED light emission body, and the LED light emission body has advantages of environmental protection, energy saving, and long service life and so on. The example does not limit the specific type of the light emission body 230. Specifically, each of the at least two first light source modules 210 comprises a plurality of light emission bodies 230 arranged along the circumferential direction of the corresponding first light source module 210, and the light distribution units 330 of the at least two first light distribution modules 310 correspondingly covers the light emission bodies 230 disposed on the corresponding first light source module 210. In practical application, the light emitted by the light emission bodies 230 of the first light source modules 210 can be projected onto the light distribution units 330 of the first light distribution modules 310, and the light distribution units 330 can distribute the light.

In the present example, the light distribution relationship between the light distribution units 330 and the light emission bodies 230 can be various. Generally, one of the light distribution units 330 performs light distribution for one of the light emission bodies 230. As shown in FIG. 2, one of the light distribution units 330 can perform light distribution on two of the light emission bodies 230; the present example does not limit the specific light distribution relationship between the light distribution units 330 and the light emission bodies 230. Of course, one of the light emission bodies 230 may further be distributed light by the plurality of light distribution units 330.

The light source assembly 200 generally comprises a substrate 240, and the light emission body 230 is disposed on the substrate 240 and can be powered by the substrate 240. The present example does not limit the specific type of the substrate 240, which may be a flexible circuit board sleeved on an installation base 100, or may be a rigid circuit board evenly arranged in blocks, and the rigid circuit board can be directly plugged and fixed in a lamp holder 500 described later. Generally, the lamp may further comprise the lamp holder 500, the light distribution element 300 comprises a receiving cavity and an opening, the opening communicates with the receiving cavity, and the light distribution element 300 is provided with a matching portion 350 on a side of the opening, and the light distribution element 300 is detachably connected to the lamp holder 500 through the matching portion 350, and the light source assembly 200 is disposed in the receiving cavity. Specifically, based on the detachable connection between the lamp holder 500 and the light distribution element 300, the receiving cavity can be exposed and closed, so as to facilitate the assembly and disassembly of the light source assembly 200, which further improves the assembly and disassembly convenience of the whole lamp.

It should be noted that the present example does not limit the specific matching relationship between the lamp holder 500 and the light distribution element 300. Generally, the matching portion 350 can be a snap structure. Based on the matching portion 350, the light distribution element 300 can realize a snap match with the lamp holder 500; of course, based on a structural deformation of the matching portion 350, the light distribution element 300 and the lamp holder 500 can further be detachably connected by means such as bonding connection, screw connection, and so on.

Generally, the lamp may further comprise the installation base 100 disposed in the receiving cavity, and the installation base 100 may be a basic component of the lamp and provide a mounting base for other components of the lamp. Of course, in the present example, the lamp may not comprise the installation base 100, and the light source assembly 200 may be attached to the light distribution element 300, the lamp holder 500 and so on.

In the present example, the first light source modules 210 are disposed on an outer peripheral surface of the installation base 100. In order to adapt to the above mentioned descriptions, the first light source modules 210 are arranged along the height direction of the installation base 100. The first light distribution modules 310 are arranged along the height direction of the installation base 100. The installation base 100 is generally in the shape of a column, so that it is convenient to arrange the light source assembly 200 thereon; of course, the installation base 100 is generally with a matching shape based on the shape and the contour of the lamp. For example, in the case where the lamp is a spherical lamp, the installation base 100 can also be arranged in a spherical shape. In order to improve a heat dissipation performance of the lamp, in an optional scheme, the light source assembly 200 may be disposed on part of the outer peripheral surface of the installation base 100, and the installation base 100 is a good thermal conductor. Specifically, the light source assembly 200 only covers part of the peripheral surface of the installation base 100, while another part of the peripheral surface not covered by the light source assembly 200 is directly exposed to the air; because the installation base 100 is a good thermal conductor, it can quickly absorb a part of heat of the light source assembly 200 (mainly directly from the substrate 240), which plays the role of evenly distributing the heat, and prevents the light source assembly 200 from being damaged due to high temperature during use.

At the same time, the heat on the installation base 100 will exchange heat with the air on the outer peripheral surface not covered by the light source assembly 200, and part of the heat will be dissipated into the air, so that the heat of the light source assembly 200 can be absorbed again to further cool the light source assembly 200.

The present example does not limit a specific material type of the installation base 100, and the installation base 100 may be made of a metal material with a good thermal conductivity such as silver and aluminum. For example, the installation base 100 may be a structural member composed of aluminum plates.

In the example in which the installation base 100 is in the shape of the column, in order to further improve the overall irradiation coverage surface of the lamp, in an optional scheme, the light source assembly 200 may further comprise a second light source module 220, and the lamp holder 500 is disposed on one side of a first end of the installation base 100, the second light source module 220 is located in the receiving cavity and is disposed at a second end of the installation base 100; the light distribution element 300 may comprise a second light distribution module 320, which is correspondingly covered on the second light source module 220.

It should be understood that the arrangement can make up for a lack of lighting of the lamp on the side of the second end of the installation base 100, and the first light source modules 210 and the second light source module 220 can be used together to realize a larger range of lighting region of the lamp. Especially in an application scenario of indoor top lighting, the example can ensure that the region at the bottom of the lamp can obtain sufficient and effective lighting effect.

Further, the light distribution unit 330 of the second light distribution module 320 may also have a divergent configuration, so that after the light emitted by the light emission body 230 of the second light source module 220 is emitted, the maximum angle difference becomes larger, thereby making the light closer to the surface of the light distribution element 300 on the side of the second end of the installation base 100, so as to further eliminate the dark region or the shadow on the surface of the light distribution element 300.

Because the light source assembly 200 needs to be powered during use, the lamp further comprises a driving assembly 400, the driving assembly 400 is disposed on the installation base 100 or the lamp holder 500, and the light source assembly 200 is electrically connected to the driving assembly 400. During use, the switch of the light source assembly 200 can be adjusted by controlling the driving assembly 400.

In the present example, the specific type of the drive component 400 is not limited, for example, the drive component 400 may be a battery. In an example, the drive component 400 may comprise an electronic control board 410 and an electronic connection portion 420, the installation base 100 comprises an inner cavity, the inner cavity is communicated with the outside at a first end of the installation base 100, and the electronic control board 410 is at least partially disposed in the inner cavity, that is, the electronic control board 410 may be partially disposed in the inner cavity, and partially disposed on the lamp holder 500, or completely disposed in the inner cavity. The light source assembly 200 is electrically connected to the electronic control board 410, and the electronic connection portion 420 is electrically connected to the electronic control board 410. In specific use, the electronic connection portion 420 is connected to a power supply to supply power to the electronic control board 410 and the light source assembly 200, and the electronic control board 410 can adjust the switch, intensity or color of the light source assembly 200.

In the present example, the electronic connection portion 420 can be arranged on the lamp holder 500, and the electronic connection portion 420 may be an electrical connection port provided on the lamp holder 500, or may be an electrical pin that passes through the lamp holder 500 and extends out of the light distribution element 300. Of course, the present example does not limit the specific type of the electronic connection portion 420.

Generally, the electronic connection portion 420 are a plurality of electrical pins, and in order to facilitate the arrangement of the electrical pins and improve an connection stability of the electrical pins, in an optional scheme, the electronic control board 410 comprises a conversion connection surface 411, and the conversion connection surface 411 is arranged on the first end of the installation base 100. One end of each of the plurality of electrical pins can be arranged on the conversion connection surface 411, and the other end of each of the plurality of electrical pins can passes through the lamp holder 500 and extend out of the lamp, so as to be electrically connected to an external power source through the electrical pins to supply power to the lamp.

The present disclosure discloses a light distribution element and a lamp to solve the problem of a dark region in the current lamp.

In a first aspect, the present disclosure provides a light distribution element, which is configured to distribute light for a light source, and the light distribution element comprises at least two first light distribution modules arranged along a height direction of the light distribution element, the at least two first light distribution modules surround the light source in a circumferential direction, each of the at least two first light distribution modules comprises a light incident surface and a light output surface that are away from each other, and the light incident surface is arranged opposite to the light source, each of the at least two first light distribution modules has a divergent light configuration from the light incident surface to the light output surface; a depression region is between two adjacent first light distribution modules.

In a second aspect, the present disclosure provides a lamp, which comprises a light source assembly and any one of the light distribution elements mentioned above, in which the light source assembly comprises at least two first light source modules arranged along a height direction of the lamp, the light distribution element comprises at least two first light distribution modules arranged along the height direction of the lamp, one of the at least two first light distribution modules covers one of the at least two first light source modules, and the one of the at least two first light distribution modules covers the one of the at least two first light source modules along the circumference direction of the lamp.

The technical schemes adopted by the present disclosure can achieve the following beneficial effects:

In a light distribution element disclosed in the present disclosure, it comprises at least two first light distribution modules arranged along its height direction, and the at least two first light distribution modules are arranged around the light source in a circumferential direction, in this way, the light distribution of the lamp in the circumferential direction of 360° can be realized; at the same time, based on the divergent light configuration of the first light distribution modules, the light emitted from the light source is scattered after passing through the first light distribution modules, a larger irradiation coverage surface is achieved in a light output direction of the first light distribution modules, therefore light paths of the light can be closer to the surface of the light distribution element.

Compared with other implementations, in a case where the light distribution element disclosed in the present disclosure is applied to the lamp, the lamp has a larger range of irradiation coverage surface, which not only improves an energy consumption utilization rate of the lamp; at the same time, after the light emitted by the light source is dispersed by the light distribution element, the light paths of the light are closer to the surface of the lamp, which can effectively eliminate a dark region of the lamp. Moreover, because the first light distribution modules are arranged along the height direction of the lamp and can distribute light in the 360° circumferential direction of the lamp, therefore the light distribution element can undoubtedly eliminate the dark region without a dead angle on the entire surface of the lamp.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the present disclosure focus on the differences between the various examples. Different optimization features between the various examples can be combined to form an additional example as long as they are not contradictory. Considering the brevity of the text, which are omitted herein.

The above descriptions are merely examples of the present disclosure, and are not used to limit the present disclosure. For those skilled in the art, the present disclosure can have various modifications and changes. Any modification, equivalent replacement, improvement, or others made within the spirit and principle of the present disclosure shall be included in the scope of the present disclosure.

What is claimed is:

1. A light distribution element, configured to distribute light for a light source, wherein the light distribution element comprises:

at least two first light distribution modules arranged along a height direction of the light distribution element, the at least two first light distribution modules surround the light source in a circumferential direction, each of the at least two first light distribution modules comprises a plurality of light distribution units arranged around the light source in the circumferential direction, and each of the plurality of light distribution units comprises a light incident surface unit and a light output surface unit that are away from each other, wherein a plurality of light output surface units are directly connected to each other along the circumferential direction so that the light output surface units are free of space and a plurality of light incident surface units are connected to each other along the circumferential direction to form a light incident surface; and the light incident surface is arranged opposite to the light source, each of the at least two first light distribution modules has a divergent light configuration from the light incident surface to the light output surface; and a depression region is between two adjacent first light distribution modules;

wherein each of the at least two first light distribution modules is configured to make an output maximum angle difference of an output light greater than an incident maximum angle difference of an incident light, so that the output light is emitted on a surface of the light distribution element to eliminate dark regions on the surface of the light distribution element, and a part of the output light is projected onto the depression region.

2. The light distribution element according to claim 1, wherein the depression region is configured to scatter light emitted by the light source.

3. The light distribution element according to claim 2, wherein:

in the height direction of the light distribution element, two adjacent light distribution units are connected to each other, and a depression portion is formed between the two adjacent light distribution units; and in the circumferential direction of the light distribution element, the depression portion is configured to be multiple, and the depression portions constitute the depression region.

4. A lamp, comprising a light source assembly and a light distribution element that is configured to distribute light for a light source, wherein:

the light distribution element comprises at least two first light distribution modules arranged along a height direction of the light distribution element, the at least two first light distribution modules surround the light source in a circumferential direction, each of the at least two first light distribution modules comprises a plurality of light distribution units arranged around the light source in the circumferential direction, and each of the plurality of light distribution units comprises a light incident surface unit and a light output surface unit that are away from each other, wherein a plurality of light output surface units are directly connected to each other along the circumferential direction so that the light output surface units are free of space and a plurality of light incident surface units are connected to each other along the circumferential direction to form a light incident surface, and the light incident surface is arranged opposite to the light source, each of the at least two first light distribution modules has a divergent light configuration from the light incident surface to the light output surface; and a depression region is between two adjacent first light distribution modules; and the light source assembly comprises at least two first light source modules that are arranged along a height direction of the lamp, and the light distribution element comprises at least two first light distribution modules that are arranged along the height direction of the lamp, wherein one of the at least two first light distribution modules covers one of the at least two first light source modules, and the one of the at least two first light distribution modules covers the one of the at least two first light source modules along the circumference direction of the lamp;

wherein each of the at least two first light distribution modules is configured to make an output maximum angle difference of an output light greater than an incident maximum angle difference of an incident light, so that the output light is emitted on a surface of the light distribution element to eliminate dark regions on the surface of the light distribution element, and a part of the output light is projected onto the depression region.

5. The lamp according to claim 4, wherein:

each of the at least two first light source modules comprises a plurality of light emission bodies that are arranged along a circumference direction of the corresponding first light source module, and light distribution units of the at least two first light distribution modules cover the light emission bodies that are disposed on the corresponding first light source module.

6. The lamp according to claim 4, wherein:

the lamp further comprises a lamp holder, and the light distribution element comprises a receiving cavity and an opening, wherein the opening communicates with the receiving cavity, and the light distribution element is provided with a matching portion on a side of the opening, and the light distribution element is detachably connected to the lamp holder through the matching portion, and the light source assembly is disposed in the receiving cavity.

7. The lamp according to claim 6, wherein:

the lamp further comprises an installation base disposed in the receiving cavity, and the at least two first light source modules are disposed on an outer peripheral surface of the installation base and are arranged along a height direction of the installation base, and the at least two first light distribution modules are arranged along the height direction of the installation base.

8. The lamp according to claim 7, wherein:

the light source assembly further comprises a second light source module, and the lamp holder is disposed on a side of a first end of the installation base, the second light source module is located in the receiving cavity and is disposed at a second end of the installation base; and the light distribution element comprises a second light distribution module, and the second light distribution module covers the second light source module.

9. The lamp according to claim 7, wherein:

the lamp further comprises a driving assembly, and the driving assembly is disposed on the installation base or the lamp holder, and the light source assembly is electrically connected with the driving assembly.

10. The lamp according to claim 9, wherein:

the installation base comprises an inner cavity, wherein the inner cavity communicates with outside at the first end of the installation base, and the driving assembly comprises an electronic control board and an electronic connection portion, and at least a part of the electronic control board is disposed in the inner cavity, the light source assembly is electrically connected to the electronic control board, and the electronic connection portion is disposed on the lamp holder and electrically connected to the electronic control board.

* * * * *